United States Patent Office 3,545,986
Patented Dec. 8, 1970

3,545,986
NOVEL SILVER COMPOSITIONS AND CAPACITORS THEREFROM
Oliver A. Short, Wilmington, Del., assignor to E. I. du Pont de Nemours and Company, Wilmington, Del., a corporation of Delaware
No Drawing. Filed Feb. 26, 1968, Ser. No. 707,958
Int. Cl. C09d 5/24; H01b 1/02
U.S. Cl. 106—1      4 Claims

ABSTRACT OF THE DISCLOSURE

Silver compositions, adapted to be applied to and fired on a reduced titanate ceramic substrate to form thereon electrically conductive, adherent fired on films, comprise 1–30% of a bismuth resinate, 40–75% of finely divided silver, and 10–70% of an inert vehicle system. Reduced titanate capacitors are prepared from the silver compositions.

BACKGROUND OF THE INVENTION

Capacitors, devices that store electrical energy, comprise conducting plates (electrodes) separated by layers of dielectric. Vitreous compositions or glasses have been utilized as the dielectric elements in the fabrication of electrical capacitors. Materials such as crystalline, barium titanate and various niobates have been substituted for sheets of glass or mica as the dielectric layer in making electrical capacitors because of their higher dielectric constants. Such dielectric bodies have generally been formed by molding the finely divided crystalline material into the desired shape, followed by firing to sinter the particles together.

A reduced titanate capacitor comprises a disc or tube of an alkaline earth titanate substrate that has first been heated in a reducing atmosphere to remove a small part of the oxygen present in the crystals, thus producing a semiconducting substrate. When the reduced titanate is coated with silver on opposite faces to form electrodes, thin nonconductive layers are formed between the semiconductor and the silver. The advantage of such a capacitor over conventional titanate capacitors is that extremely high capacitance is obtained without increasing the physical size of the unit.

Reduced titanate capacitors made from common silver compositions, such as compositions described by Larsen and Short, U.S. Pat. 2,822,279, have somewhat higher capacitance than capacitors made from regular titanate substrates. However, there is a continuing need to produce capacitors which have higher capacitance values and relatively low dissipation factors. One or more of these properties can be improved by the use of better silver compositions which are adapted to be applied to and fired onto reduced titanate dielctric substrats to form better electrode films in capacitors.

SUMMARY OF THE INVENTION

This invention relates to novel silver compositions containing a bismuth resinate and reduced titanate capacitors electroded with these silver compositions. Briefly, the invention is accomplished by utilizing a bismuth resinate in place of a conventional inorganic binder.

Accordingly, the improved silver compositions of this invention, which are adapted to be applied to and fired on a reduced titanate dielectric ceramic substrate to form thereon an electrically conductive, adherent fired on film, consist essentially of, by weight, 40–75% finely divided silver, 1–30% of a bismuth resinate and 10–70% of an inert vehicle system.

DESCRIPTION OF THE PREFERRED EMBODIMENTS

This invention resides in the use of a bismuth resinate in place of the conventional inorganic binder in silver compositions. Reduced titanate capacitors prepared from these bismuth resinate-containing silver compositions display extremely high capacitance and relatively low dissipation factors. Bismuth resinates are well known in the art and are generally considered to be salts of the resin acids found in rosin. The most common resin acids are abietic acids and primaric acids. It is to be understood, however, that any of the common resin acids which form salts with bismuth are considered to be bismuth resinates within the scope of this invention. Other bismuth organic compounds, such as bismuth naphthenate, can also be used in place of the inorganic binder.

The bismuth resinates are produced by conventional procedures. Any resin acid or mixtures of resin acids are reacted with a suitable bismuth compound above the melting point of the acid to form the bismuth resinates. A suitable solvent system is selected to dissolve the bismuth resinate compound. Silver compositions are then prepared by mixing the bismuth resinate solution, finely divided silver and additional inert vehicle. The particle size of the silver is generally within the range of from 0.01–10 microns, which is sufficiently finely divided to pass through a 325 mesh (U.S. Standard sieve scale) stencil screen.

The invention is illustrated by the following examples. In the examples and elsewhere in the specification, all parts, ratios and percentages of materials or components are by weight.

EXAMPLE 1

Bismuth resinate was prepared by reacting 79 grams of bismuth subnitrate ($BiONO_3$) with 21 grams of wood rosin at a temperature slightly above the melting point of the rosin. This reaction was very slow and required several days to reach completion. Then a solvent system was added which preferentially dissolved the bismuth resinate but not the unreacted starting materials. One hundred grams of a solvent which consisted of 25 grams cineol, 30 grams ortho nitrotoluene, 20 grams monochlorobenzene, 15 grams synthetic camphor and 10 grams spike lavender oil. The temperature of the solvent mixture and solids phase was raised to a temperature within the range of 60–80° C. to effect solution. This solution was allowed to stand undisturbed for two weeks to permit the unreacted bismuth subnitrate to settle. The solution of bismuth resinate was decanted off as the desired product.

A total solids test was run by igniting an aliquot of the bismuth resinate solution. This is done by burning the solution in a furnace and allowing the organics to be driven off whereby the bismuth resinate was oxidized to $Bi_2O_3$. The solids content of the aliquot was weighed and calculated to be 7.3% $Bi_2O_3$.

For purposes of preparing a standardized laboratory solution, the concentration of the bismuth resinate solution was adjusted to 5% $Bi_2O_3$ equivalents by the addition of solvent. This solution was evaporated to 50% of its weight and made up to 80% with pine oil. At this point, the bismuth resinate solution would yield 6.2% $Bi_2O_3$ upon ignition.

The solids (ignition) test is a convenient way to analyze for the operable proportions of the invention. By igniting the bismuth resinate solution and oxidizing the resinate to $Bi_2O_3$, the range of $Bi_2O_3$ provides an additional criteria for the proportions of the invention. It has been found that bismuth resinate solutions, which, upon ignition, yield 1–10% $Bi_2O_3$, based on the solids content of the silver composition, are operable for purposes of this invention.

EXAMPLE 2

A silver composition was formulated by admixing 62% finely divided silver powder, 25.8% of the bismuth resinate solution of Example 1 (which upon ignition would yield 1.6% $Bi_2O_3$) and 12.2% of a vehicle consisting of 10% ethyl cellulose and 90% beta-terpineol. Then the silver composition was printed in the form of electrodes onto a barium titanate disc (½″ in diameter and 20 mils thick) which had been partially reduced by firing to about 2200° F. in a hydrogen atmosphere. The silver compositions were fired onto the disc at about 760° C. Copper wire leads were attached to the silver electrode and the capacitance and dissipation factor of the capacitor were determined. A capacitance of 0.47 microfarad and a dissipation factor of 9% were recorded. In comparison, a reduced titanate capacitor made from the conventional silver compositions (disclosed in U.S. Pat. 2,822,279) exhibited a capacitance of 0.02 microfarad.

This example demonstrated the highly desirable results obtained from using the silver composition of this invention. Such high capacitance values are generally not obtainable from prior art silver compositions on reduced titanate capacitors.

It is also possible to include other desirable additives in the silver compositions. In particular, it has been discovered that the inclusion of the novel glass and/or silver compositions therefrom, as disclosed in my copending S.N. 707,942, filed Feb. 26, 1968, has been beneficial to reduced titanate capacitors. Therefore, mixtures of the silver compositions of this application and the glass and/or silver compositions of S.N. 707,942 are within the scope of this invention. In general, from 0.01–10% of a finely divided glass frit, which consists essentially of 25–50% PbO, 50–75% $Bi_2O_3$ and 1–10% $B_2O_3$, may be included in the silver compositions of this invention. The following example illustrates this feature of the invention.

EXAMPLE 3

Fifty grams of the silver compositions prepared in Example 2 of this application and 50 grams of the silver composition prepared in Example 1 of S.N. 707,942 were mixed together. The latter silver composition contained 64% solids content which consisted of 97% finely divided silver and 3% glass frit (70% $Bi_2O_3$, 27% PbO and 3% $B_2O_3$) dispersed in 36% of an inert vehicle (8% ethyl cellulose and 92% beta-terpineol). The resulting silver composition was printed and fired onto reduced barium titanate discs as described above in Example 2. The resulting capacitance was 0.43 microfarad and the dissipation factor was 4%.

In preparing the silver compositions, any inert liquid may be utilized as the vehicle. Water or any one of various organic liquids with or without thickening and/or stabilizing agents, and/or other common additives may be used. Examples of organic liquids that can be used are the aliphatic alcohols; esters of such alcohols, for example, the acetates and propionates; the terpenes, such as pine oil, alpha- and beta-terpineol and the like; solutions of resins such as polymethacrylates of lower alcohols, or solutions of ethyl cellulose, in solvents such as pine oil and the monobutyl ether of ethylene glycol monoacetate. The vehicles of my application, Ser. No. 617,855, now abandoned, may also be used. The vehicle may contain or be composed of volatile liquids to promote fast setting after application; or it may contain waxes, thermoplastic resins or the like materials which are thermofluids so that the vehicle-containing composition may be applied at elevated temperatures to a relatively cold ceramic body upon which the composition sets immediately.

Any suitable solvent system which will selectively dissolve the bismuth resinate but not the starting reaction products (e.g., bismuth subnitrate) may be utilized. It is also desirable that the solvent system be compatible with any inert vehicle which may be used to disperse the finely divided silver. Typical solvents usable in this invention, alone or as mixtures, include: methyl ethyl ketone, cyclohexanone, ethyl acetate, amyl acetate, Cellosolve, butanol, nitrobenzene, toluene, xylene, petroleum ether, chloroform, carbon tetrachloride, various terpenes, such as pinene, dipentene, dipentene oxide and the like, essential oils, such as oils of lavender, rosemary, aniseed, sassafras, wintergreen, fennel and terpentine, various rosins and balsams and synthetic resins.

The entire system of inert vehicles and solvents which are used to disperse silver and dissolve the bismuth resinate is referred to as the "inert vehicle system." This, of course, is intended to include all mixtures of various liquids which may be utilized for the purposes described above. Thus, the most typical system will include a vehicle/solvent mixture. In such a case, the silver will remain suspended or dispersed in the entire mixture of liquids which is referred to as the inert vehicle system.

The proportions of inert vehicle: solids (silver, etc.) in the silver compositions of this invention may vary considerably depending upon the manner in which the paint or paste is to be applied and the kind of vehicle used. Generally, from 30–90% solids are dispersed in from 70–10% of the inert liquid vehicle. Preferably, 30–50% by weight of vehicle will be used.

Since it is obvious that many changes and modifications can be made in the above-described details without departing from the nature and spirit of the invention, it is to be understood that the invention is not to be limited to said details except as set forth in the appended claims.

I claim:

1. A silver composition adapted to be applied to and fired on a reduced titanate dielectric ceramic substrate to form thereon an electrically conductive, adherent fired on film, said composition comprising, by weight, 40–75% finely divided silver, 1–30% of a bismuth resinate and 10–70% of an inert vehicle system.

2. A silver composition in accordance with claim 1, which additionally contains 0.01–10% of a finely divided glass frit which consists essentially of 25–50% PbO, 50–75% $Bi_2O_3$ and 1–10% $B_2O_3$.

3. A silver composition adapted to be applied to and fired on a reduced titanate dielectric ceramic substrate to form thereon an electrically conductive, adherent fired on film, said composition consisting essentially of, by weight, 40–75% finely divided silver, 1–30% of a bismuth resinate and 10–70% of an inert vehicle system, wherein said resinate upon ignition provides an amount of $Bi_2O_3$ equal to 1–10% of the solids content.

4. A silver composition in accordance with claim 3 which additionally contains 0.01–10% of a finely divided glass frit which consists essentially of 25–50% PbO, 50–75% $Bi_2O_3$ and 1–10% $B_2O_3$.

References Cited
UNITED STATES PATENTS 2,081,234   5/1937   Hefter _____ 106—1

JULIUS FROME, Primary Examiner

L. B. HAYES, Assistant Examiner

U.S. Cl. X.R.

117—123, 160, 227; 252—514